(12) United States Patent
Moulin et al.

(10) Patent No.: US 10,683,168 B2
(45) Date of Patent: Jun. 16, 2020

(54) AUTOMATED GUIDED TROLLEY FOR THE TRANSPORT AND/OR HANDLING OF A LOAD

(71) Applicant: EXOTEC SOLUTIONS, Lille (FR)

(72) Inventors: Romain Moulin, Paris (FR); Renaud Heitz, Paris (FR)

(73) Assignee: EXOTEC SOLUTIONS, Lille (FR)

( * ) Notice: Subject to any disclaimer, the term of this patent is extended or adjusted under 35 U.S.C. 154(b) by 0 days.

(21) Appl. No.: 15/768,261

(22) PCT Filed: Oct. 13, 2016

(86) PCT No.: PCT/FR2016/052650
§ 371 (c)(1),
(2) Date: Apr. 13, 2018

(87) PCT Pub. No.: WO2017/064428
PCT Pub. Date: Apr. 20, 2017

(65) Prior Publication Data
US 2018/0305126 A1    Oct. 25, 2018

(30) Foreign Application Priority Data

Oct. 13, 2015 (FR) ..................................... 15 59698

(51) Int. Cl.
*B65G 1/04* (2006.01)
*B65G 1/02* (2006.01)
*B65G 1/137* (2006.01)

(52) U.S. Cl.
CPC ............. *B65G 1/0492* (2013.01); *B65G 1/02* (2013.01); *B65G 1/0485* (2013.01); *B65G 1/1378* (2013.01)

(58) Field of Classification Search
CPC combination set(s) only.
See application file for complete search history.

(56) References Cited

U.S. PATENT DOCUMENTS

| 4,515,235 | A | * | 5/1985 | Yamamoto | ............... | B62D 1/28 |
| | | | | | | 16/44 |
| 5,288,059 | A | * | 2/1994 | Gautheron | .............. | F16F 1/387 |
| | | | | | | 267/141.2 |

(Continued)

FOREIGN PATENT DOCUMENTS

| DE | 9320592 U1 | 1/1995 |
| EP | 1348646 A2 | 10/2003 |

(Continued)

OTHER PUBLICATIONS

International Search Report dated Jan. 19, 2017, for corresponding International Application No. PCT/FR2016/052650, filed Oct. 13, 2016.

(Continued)

*Primary Examiner* — Kyle O Logan
(74) *Attorney, Agent, or Firm* — David D. Brush; Westman, Champlin & Koehler, P.A.

(57) ABSTRACT

An automated guided trolley for transport and/or handling of a load. The automated guided trolley includes a main frame for receiving the load and a carrier frame having two walking beams pivotally mounted relative to each other by a pivot and respectively extending forwards and backwards of the trolley and each equipped with at least one idler wheel, one of the walking beams being mounted on two differential-drive wheels whose axes are situated in the transverse plane of the main frame. The trolley includes an articulation of the main frame relative to the balanced wheel extending forwardly and relative to the rearwardly extending balanced wheel, configured so that the assembly of the main frame with the carrier frame is sensibly isostatic.

11 Claims, 2 Drawing Sheets

(56) References Cited

U.S. PATENT DOCUMENTS

| | | |
|---|---|---|
| 7,101,139 B1 | 9/2006 | Benedict |
| 7,381,022 B1 | 6/2008 | King |
| 10,457,483 B2 | 10/2019 | DeWitt |
| 2009/0224133 A1* | 9/2009 | Gass ..................... F16M 3/00 |
| | | 248/651 |
| 2011/0094854 A1 | 4/2011 | Hayduchok |
| 2012/0003993 A1 | 1/2012 | Leino et al. |
| 2012/0039693 A1 | 2/2012 | Benedict et al. |
| 2012/0185082 A1 | 7/2012 | Toebes et al. |
| 2012/0189410 A1 | 7/2012 | Toebes et al. |
| 2012/0207580 A1 | 8/2012 | Nave et al. |
| 2014/0031972 A1 | 1/2014 | Dewitt et al. |
| 2014/0257555 A1 | 9/2014 | Bastian et al. |
| 2014/0288696 A1 | 9/2014 | Lert |
| 2016/0207710 A1 | 7/2016 | Conrad et al. |
| 2016/0280461 A1 | 9/2016 | Geiger et al. |
| 2016/0355337 A1 | 12/2016 | Lert et al. |
| 2017/0101263 A1 | 4/2017 | Schroer |
| 2017/0174431 A1 | 6/2017 | Borders et al. |
| 2017/0334644 A1 | 11/2017 | Otto et al. |
| 2019/0023492 A1 | 1/2019 | Voloskov |
| 2019/0210802 A1 | 7/2019 | Ueda et al. |
| 2019/0329978 A1 | 10/2019 | Li et al. |

FOREIGN PATENT DOCUMENTS

| | | |
|---|---|---|
| FR | 2574039 A1 | 6/1986 |
| JP | H0811712 A | 1/1996 |
| JP | 2004249895 A | 9/2004 |
| JP | 2007283958 A | 11/2007 |
| TW | 474885 B | 2/2002 |
| WO | 2010100513 A2 | 9/2010 |
| WO | 2014166640 A2 | 10/2014 |
| WO | 2015070841 A1 | 5/2015 |

OTHER PUBLICATIONS

English translation of the Written Opinion of the International Searching Authority dated Jan. 19, 2017, for corresponding International Application No. PCT/FR2016/052650, filed Oct. 13, 2016.

International Search Report dated Jan. 5, 2017, for corresponding International Application No. PCT/FR2016/052609, filed Oct. 9, 2016.

English translation of the Written Opinion of the International Searching Authority dated Jan. 5, 2017, for corresponding International Application No. PCT/FR2016/052609, filed Oct. 9, 2016.

French Search Report and Written Opinion dated Jun. 6, 2016 for corresponding French Application No. 1559698, filed Oct. 13, 2015.

French Search Report and Written Opinion dated Mar. 22, 2017 for French Application No. 1659919.

Office Action dated Nov. 29, 2019 from corresponding U.S. Appl. No. 15/768,269, filed Apr. 13, 2018.

* cited by examiner

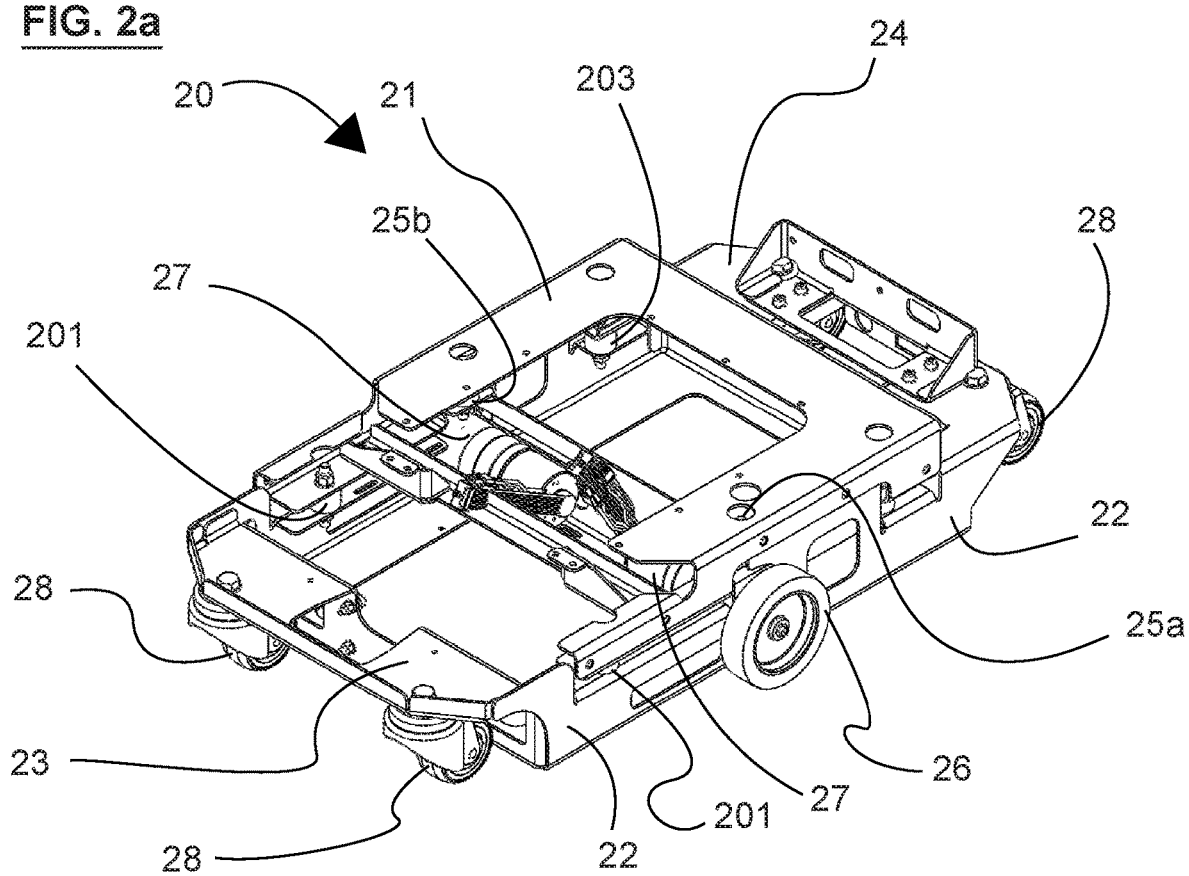
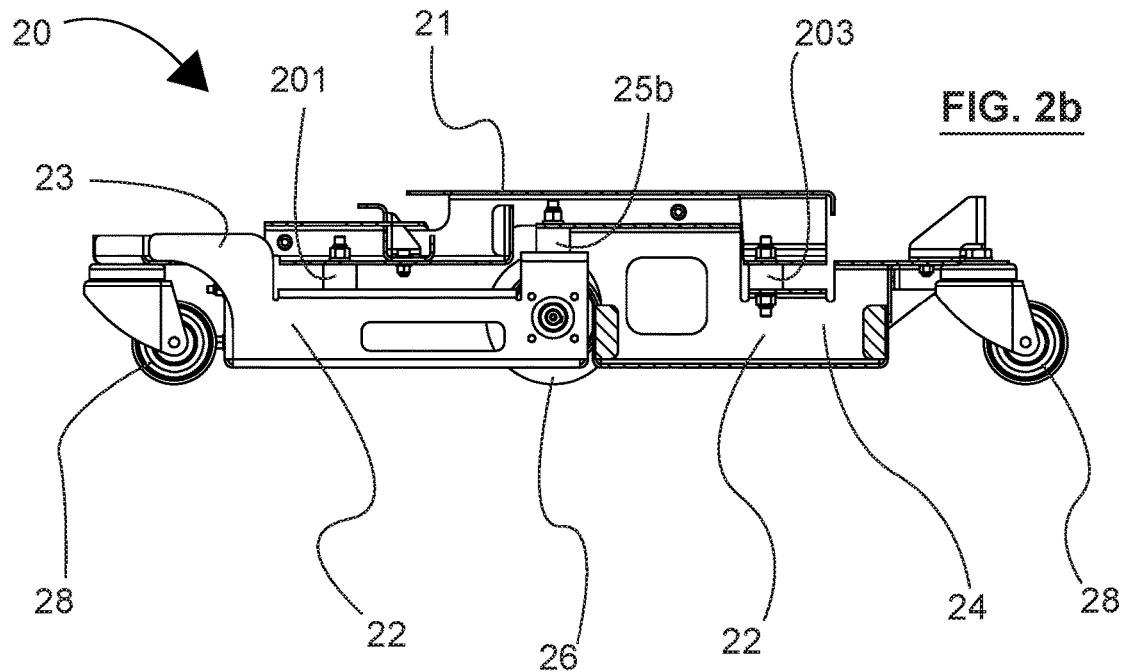

US 10,683,168 B2

AUTOMATED GUIDED TROLLEY FOR THE TRANSPORT AND/OR HANDLING OF A LOAD

1. CROSS-REFERENCE TO RELATED APPLICATIONS

This application is a Section 371 National Stage Application of International Application No. PCT/FR2016/052650, filed Oct. 13, 2016, the content of which is incorporated herein by reference in its entirety, and published as WO 2017/064428 on Apr. 20, 2017, not in English.

2. FIELD OF THE INVENTION

The field of the invention is logistics.

More particularly, the invention relates to an automated guided trolley.

The invention finds particular application in handling and transport of parts or products in a warehouse.

3. STATE OF THE ART

The significant growth of online business has directly impacted the control flow management strategies and handling of products in a logistics warehouse.

It is well known to automate transport tasks in a warehouse to gain speed of delivery.

So, it has been contemplated to use automated guided trolleys to carry boxes containing items up to an order preparing area.

Automated guided trolleys used to carry racks from a warehouse to a product collection point by an operator in these racks are known. Quite often, the chassis of these robots is connected via four-wheel suspensions.

A disadvantage of known automated guided trolleys is that their mobility is affected when the load on the different wheels of the truck is not balanced, due to uneven distribution of the products in the box or on the rack that is transported, or when they are transported on uneven ground.

Moreover, to avoid that in the absence of load to transport, the grip of the wheels on the ground is greatly reduced, and limits the acceleration and deceleration capabilities of the trolley, the aim is to increase the weight of the automated guided trolley in order to pre-compress the suspensions.

This has the disadvantage of increasing the energy required to move the trolley and thus reduce its autonomy.

Another disadvantage of these known automated guided trolleys is that when the load is too large, the suspensions are compressed at their maximum. The weight distribution of the load carried by the tray is then transmitted as such to the wheels. The weight of the load cannot then be distributed on each wheel.

Among these known automated guided trolleys, some can be configured to have bogie-mounted axles, arranged one at the front, the other at the rear of a body or car.

This known technique of automated guided trolley on bogies has the same shortcomings as above-mentioned techniques.

Another disadvantage of these automated guided trolleys on bogies is that they cannot rotate around themselves.

4. SUMMARY OF THE INVENTION

An embodiment of the invention relates to an automated guided trolley for the transport and/or handling of a load.

The invention thus relates to an automated guided vehicle, also known by the acronym AGV. This automated guided vehicle can be equipped with one or several arms for gripping objects, without departing from the scope of the invention.

According to the invention, such an automated guided trolley comprises a main frame for receiving said load and a carrier frame comprising two walking beams pivotally mounted relative to each other by means of pivoting means, respectively extending towards the front and rear of said trolley and each equipped with at least one idler wheel, one of the walking beams being mounted on two wheels with differential drive whose axis is located in the transverse plane of the main chassis, the trolley comprising means for hinging the main chassis with respect to the walking beam extending forward and in relation to the walking beam extending rearward, configured so that the assembly of the main chassis with the carrier frame is substantially isostatic.

Thus, in a novel way, the invention proposes to implement two walking beams to distribute the weight of the load carried by the main frame uniformly between the differential drive wheels and the idler wheels, regardless of that load.

The implementation of the walking beams also makes it possible to limit the weight of the automated guided trolley, which gives it better performance in terms of autonomy and speed of movement in particular.

It should be noted that throughout the description of this patent application, reference is made to a feeding direction of the trolley when using the terms forward, back, right and left of the trolley.

In addition, the load distribution is performed equally between the front and the rear, but also between the right and the left of the trolley.

Furthermore, the invention proposes to place the differential-drive wheels in the transverse plane of the trolley, which is the vertical median plane orthogonal to the longitudinal axis of the automated guided trolley, in order to increase the adhesion thereof and thus optimise the transfer of the engine torque to the ground.

According to an advantageous embodiment of the invention, the pivoting axis of the walking beams relative to each other is located in the transverse plane of the trolley.

Thus, a torque is prevented from being exerted on the axis of the differential drive wheels.

According to a preferred embodiment of the invention, the hinging means comprise a first, a second and a third pair of connecting rods, the connecting rods of each pair of connecting rods being mounted opposite to each other on each side of the sagittal plane of the trolley, the first pair of connecting rods and the second pair of connected rods being secured to one of the walking beams and the third pair of connected rods being secured to the other walking beam, the axes of each of the connecting rods of the first and second pairs of connected rods extending by intersecting it up to the same transverse axis, so as to form a pivot connection between the walking beam to which the first and second pairs of connected rods are secured and the frame main.

In the description, the sagittal plane is the vertical median plane going through to the longitudinal axis of the automated guided trolley.

According to a particularly advantageous embodiment of the invention, the transverse axis extends substantially at the lowest point of the trolley.

The implementation of two pairs of connecting rods, whose longitudinal axes are secant on a transverse axis substantially at the lowest point of the trolley in contact with the ground, reduces or cancels the mass transfer effects during the acceleration and deceleration phases of the automated guided trolley.

According to a particular embodiment of the invention, the hinging means comprise at least a first and a second pair of elastic joints respectively secured to the walking beam extending forward and the walking beam extending rearwardly, the elastic joints of each of the first and second pairs of elastic joints being mounted opposite to each other on each side of the sagittal plane of the trolley.

Thus, the shearing of the elastic joints makes it possible to take up the variation along the longitudinal axis of the position of the walking beams.

In addition, the movement of the walking beams is cushioned by the elastic joints.

According to an advantageous embodiment of the invention, at least one of the walking beams is equipped with two idler wheels mounted thereon in positions symmetrical with respect to the sagittal plane of the trolley.

By separating the two idler wheels from the sagittal plane, the trolley can then be guided by a ground guiding device, such as a line along which it travels on horseback.

According to a preferred embodiment of the invention, the two differential-drive wheels are rotated by two independently controlled motors, sais motors being fixed to the same walking beam as the differential-drive wheels.

Thus, the automated guided trolley is able to rotate in order to change directions, for example during start-up.

According to a particular embodiment of the invention, the pivoting means of the walking beams relative to each other comprise two pivots or two ball joints mounted on the walking beams in the transverse plane, on the left and right side of the trolley.

According to a particular embodiment of the invention, the pivoting means of the walking beams relative to each other comprise two pivots or two elastic joints mounted between the walking beams in the transverse plane, on the left and right side of the trolley.

According to a particularly advantageous embodiment of the invention, the elastic joints are rubber suspensions.

In other embodiments of the invention, the elastic joints may be any other known type of elastic joints.

5. LIST OF FIGURES

Other features and advantages of the invention will become evident on reading the following description of one particular embodiment of the invention, given by way of illustrative and non-limiting example only, and with the appended drawings among which:

FIG. 2a is a perspective view of a second exemplary embodiment of an automatic guided trolley according to the invention;

FIG. 2b is a vertical sectional view of one side of the automatically guided trolley shown in FIG. 2a.

6. DETAILED DESCRIPTION OF THE INVENTION

Figure 1:
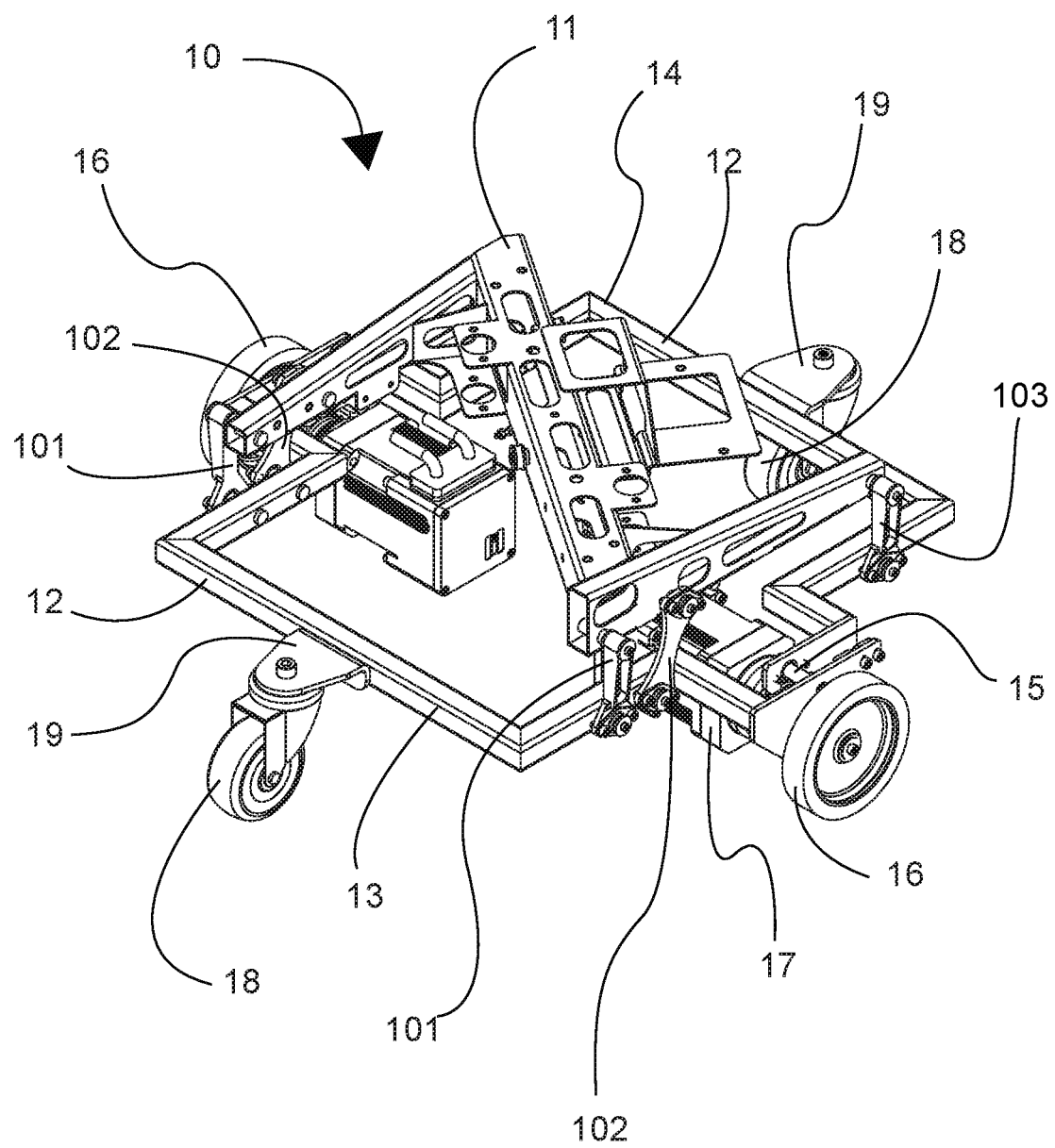
FIG. 1 is a perspective view of a first exemplary embodiment of an automatic guided trolley according to the invention.

6.1. First Exemplary Embodiment of the Invention

FIG. 1 illustrates an exemplary embodiment of an automatic guided trolley 10 according to the invention, dedicated to the transport and/or handling of a load. This self-guided trolley 10 comprises a main frame 11, intended to receive a load, supported by a carrier frame 12 ensuring the ground connection of the automatic guided trolley 10.

To do so, the carrier frame 12 comprise a first walking beam 13 extending towards the front of the self-guided trolley 10 and a second walking beam 14 extending rearwardly. The frames of the walking beams 13 and 14 are interconnected on each side by a pivot 15 whose pivot axis is located in the transverse plane of the automatic guided trolley 10.

As can be seen in FIG. 1, the main frame 11 is articulated relative to the carrier frame 12 with three pairs of connecting rods 101, 102 and 103. To do so, the connecting rods of each pair of connecting rods 101, 102 and 103 are mounted opposite to each other on the main frame 11 on each side of the sagittal plane of the automatic guided trolley 10.

Furthermore, the connecting rods of a first pair of connected rods 101 and of a second pair of connecting rods 102 are secured by their ends to the frame of the first walking beam 13 and the main frame 11. Each connecting rod of the first pair of connecting rods and the second pair of connecting rods is arranged so as to have a longitudinal axis which extends to intersect the same transverse axis. Thus, a pivot connection is obtained around this transverse axis between the main frame 11 and the first walking beam 13.

This transverse axis is located in this particular embodiment of the invention substantially at the point of contact of the wheels 16, 18 with the ground, which has the effect of greatly reducing, or even eliminating, the mass transfer effects of the invention of the load between the wheels, during the acceleration and deceleration phases of the self-guided trolley 10.

Furthermore, the connecting rods of a third pair of connecting rods 103 are at their ends, secured to the frame of the second walking beam 14 and the main frame 11, to ensure the articulation of the main frame 11 with the carrier frame 12. We obtain thus a substantially isostatic main frame 11-carrier frame 12 assembly.

In order to allow the automatic guided trolley 10 to move, the ground connection system comprises two drive wheels 16 with differential drive whose axis is located in the median transverse plane of said support frame 12. The rotation drive of the two driving wheels 16 is provided by two motors 17 with independent controls which are mounted as the two driving wheels 16 on the frame of the walking beam 13. These two motors 17 are housed in an interior volume of the carrying chassis 12 delimited by the frames of the first and second walking beams 13, 14.

Note that the differential drive of the central drive wheels 16 can allow the self-guided trolley 10 to turn round.

In addition, the first and the second frame 13, 14 forming a walking beam each comprise an idler wheel 18. These idler wheels 18 are fixed by tabs 19 at the ends of the frames of the walking beams, in the sagittal plane of the automatic guided trolley 10.

Finally, as can be seen in FIG. 1, the driving wheels 16 and the pivoting axis of the walking beams 13 and 14 are located halfway with respect to the two idler wheels 18. Thus, the load is substantially distributed 50% on the driving wheels 16 and 25% on each of the idler wheels 18.

6.2. Other Exemplary Embodiments of the Invention

FIGS. 2a and 2b show a perspective view and a sectional view along the sagittal plane of another example of an automatic guided trolley 20 according to the invention, intended for handling and/or transporting a charge.

This automatic guided trolley 20 comprises a main frame 21 (partially shown in FIGS. 2a and 2b, for the sake of legibility) articulated on a support frame 22.

The carrier frame 22 is formed of two walking beams 23, 24, secured by two elastic joints 25, mounted on two drive wheels 26 with differential drive. Each walking beam 23, 24 has two idler wheels 28 at its distal end, fixed to the body of the walking beam in symmetrical positions relative to the transverse plane of the carrier frame 22.

The two rubber suspensions 25a, 25b are mounted respectively on the right side and the left side of the walking beams 23, 24, in the transverse plane of the carriage 20. They make it possible to create a pivot type connection between the two walking beams.

Furthermore, each walking beam 23, 24 is secured to the main frame 21 by a first pair of rubber suspensions 201, respectively by a second pair of rubber suspensions 203.

The rubber suspensions of each pair 201, 203 of rubber suspension are mounted opposite to each other on the body of the walking beams 23, 24, on each side of the sagittal plane of the automatic guided trolley 20.

It will be noted that the use of a pair of rubber suspensions 201, 203 makes it possible to form an overall elastic articulation, similar to a pivot-type connection, between the walking beam 23, 24 and the main frame 21.

6.3. Other Optional Features and Advantages of the Invention

In variations of the embodiments of the invention detailed above, it can also be provided:
- to distribute the load differently between the drive wheels and the idler wheels by moving the position of the articulation means to adjust the distribution ratios and thus promote the stability of the trolley or the traction of the driving wheels;
- to use three identical or different pairs of connecting rods;
- the articulation at the end of some connecting rods is a ball joint or a pivot;
- to use ball-joint connecting rods on a walking beam and pivot connecting rods on the other walking beam;
- to use connecting rods on a walking beam and elastic blocks or rubber suspensions on the other walking beam.

An exemplary embodiment of the invention remedies the shortcomings of the state of the art mentioned above.

An exemplary embodiment provides an automated guided trolley for transporting and/or handling a load whereas all wheels suitably adhere to the ground, regardless whether the trolley is loaded or empty.

An exemplary embodiment provides such an automated guided trolley technique in which the adhesion of the wheels to the ground is directly proportional to the weight transported.

An exemplary embodiment provides such an automated guided trolley technique which maintains the level of adhesion of the drive wheels, regardless of the distribution of the load transported.

An exemplary embodiment provides such an automated guided trolley technique which limits load transfer problems during the acceleration and deceleration phases.

An exemplary embodiment proposes an automated guided trolley technique, whose energy autonomy is increased.

An exemplary embodiment provides such an automated guided trolley technique which is simple to implement, reliable and low cost.

Although the present disclosure has been described with reference to one or more examples, workers skilled in the art will recognize that changes may be made in form and detail without departing from the scope of the disclosure and/or the appended claims.

The invention claimed is:

1. An automated guided trolley for transport and/or handling of a load, wherein the automated guided trolley comprises:
   a main frame for receiving said load; and
   a carrier frame comprising first and second walking beams pivotally mounted relative to each other by a pivot, and respectively extending towards the front and rear of said trolley and each equipped with at least one idler wheel, wherein at least one of said walking beams is mounted on first and second differential-drive wheels whose axis is situated in a transverse plane of said main frame,
   an articulation of said main frame relative to said walking beam extending forwardly and relative to said rearwardly extending walking beam, configured so that an assembly of said main frame with said carrier frame is substantially isostatic.

2. The automated guided trolley according to claim 1, wherein a pivot axis of said walking beams relative to each other is located in the transverse plane of said trolley.

3. The automated guided trolley according to claim 1, wherein said articulation comprises a first, a second and a third pair of connecting rods, the connecting rods of each pair of connecting rods being mounted opposite each other, on each side of a sagittal plane of said trolley,
   said first pair of connecting rods and said second pair of connecting rods being secured to one of said walking beams and said third pair of connecting rods being secured to the other walking beam, the axes of each of the connecting rods of said first and second connecting rods extending to a same transverse axis and cutting the same, so as to form a pivot connection between said beam to which said first and second pairs of connecting rods are secured and said main frame.

4. The automated guided trolley according to claim 3, wherein said transverse axis extends substantially at the lowest point of said trolley.

5. The automated guided trolley according to claim 1, wherein said articulation comprises at least a first and a second pair of elastic joints respectively secured to said walking beam extending forwardly and said walking beam extending rearward, the elastic joints of each of said first and second pairs of elastic joints being mounted opposite to each other on each side of the sagittal plane of said trolley.

6. The automated guided trolley according to claim 5, wherein said elastic joints are rubber suspensions.

7. The automated guided trolley according to claim 1, wherein at least one of said walking beams is equipped with first and second idler wheels mounted thereon in positions symmetrical with respect to the sagittal plane of said trolley.

8. The automated guided trolley according to claim 1, wherein said first and second differential drive are rotated by first and second motors controlled independently and said motors are fixed to the same walking beam as said differential drive wheels.

9. The automated guided trolley according to claim 1, wherein the pivot comprises two pivots or two ball joints mounted on said walking beams in said transverse plane, on left and right sides of said trolley.

10. The automated guided trolley according to claim 1, wherein the pivot comprises two elastic joints mounted on said walking beams in said transverse plane, on left and right sides of said trolley.

11. The automated guided trolley according to claim 10, wherein said elastic joints are rubber suspensions.

\* \* \* \* \*